United States Patent
Van Wyck Loomis (10) Patent No.: US 7,856,336 B2
(45) Date of Patent: *Dec. 21, 2010

(54) FORWARD-LOOKING ALTITUDE DETECTOR

(75) Inventor: Peter Van Wyck Loomis, Sunnyvale, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 285 days.

This patent is subject to a terminal disclaimer.

(21) Appl. No.: 12/157,519

(22) Filed: Jun. 11, 2008

(65) Prior Publication Data

US 2009/0312975 A1   Dec. 17, 2009

(51) Int. Cl.
  *G06F 15/00* (2006.01)
(52) U.S. Cl. .................. 702/141; 702/96; 702/150; 702/154; 701/216; 342/357.06; 342/357.14
(58) Field of Classification Search ........... 702/141, 702/96, 150, 154; 342/357.06, 357.14; 701/216
See application file for complete search history.

(56) References Cited

U.S. PATENT DOCUMENTS

| | | | |
|---|---|---|---|
| 2,659,985 A | 11/1953 | Cloud | |
| 4,586,138 A | 4/1986 | Mullenhoff et al. | |
| 5,416,712 A | 5/1995 | Geier et al. | |
| 6,374,172 B1 | 4/2002 | Yamaguchi et al. | |
| 6,531,981 B1 | 3/2003 | Fuller et al. | 342/357.03 |
| 6,552,681 B1 | 4/2003 | Hayward et al. | 342/357.06 |
| 6,704,650 B1 | 3/2004 | Fuller et al. | 701/213 |
| 7,650,252 B2 | 1/2010 | Douglas | |
| 2005/0085950 A1 | 4/2005 | Altenkirch | |
| 2006/0074540 A1 | 4/2006 | Braunberger et al. | |
| 2007/0038356 A1 | 2/2007 | Braunberger et al. | |
| 2009/0326858 A1* | 12/2009 | Ueda et al. | 702/141 |

FOREIGN PATENT DOCUMENTS

| | | |
|---|---|---|
| EP | 1 213 561 A1 | 6/2002 |
| EP | 1213561 B1 | 6/2002 |
| EP | 2 034 270 A1 | 3/2009 |
| JP | 3165265 | 7/1991 |
| JP | 07-083659 A | 3/1995 |
| JP | 7083659 A | 3/1995 |

(Continued)

OTHER PUBLICATIONS

Elliot Kaplan & Christopher Hegarity editors, "Understanding GPS: Principles and Applications" 2nd edition, published by Artech house, Inc. of Norwood, Massachusetts, copyright 2006, ISBN 1-58053-894-0, J.; with Blake Bullock, Michael Foss, G. Jeffrey Geier & Michael King authors of chapter 9 "Integration of GPS with Other Sensors and Network Assistance", chapter 9.3 "Sensor Integration in Land Vehicles", pp. 491-523.

(Continued)

*Primary Examiner*—Drew A Dunn
*Assistant Examiner*—Hien X Vo (57) ABSTRACT

An altitude dead reckoning system using a measured forward speed and a measured forward-looking acceleration in a dead reckoning (DR) altitude calculator to calculate an altitude change. The DR altitude calculator may also use a measured yaw angle rate to provide compensation to improve the accuracy of the altitude change calculation.

28 Claims, 9 Drawing Sheets

FOREIGN PATENT DOCUMENTS

| | | |
|---|---|---|
| JP | 2001-108701 A | 4/2001 |
| JP | 2001108701 A | 4/2001 |
| JP | 2007-221843 A | 8/2007 |
| JP | 2007221843 A | 8/2007 |
| WO | WO 03/040652 A1 | 5/2003 |
| WO | WO 2007/148818 A1 | 12/2007 |
| WO | PCT/US2009/040659 | 4/2009 |

OTHER PUBLICATIONS

Joe Chernesky, Phil Hartstein & Steve Knauer, "SkyNetix—Assisted GPS", Patent Sale Offering—Three Issued U.S. Patents Covering Assisted GPS Positioning for Mobile Handsets, pp. 1 to 39, IPotential LLC, 1400 Fashion Island Blvd., Suite 601, San Mateo, California.

PCT, International Search Report, PCT/US2009/040659, mailed Aug. 14, 2009, 8 pages.

* cited by examiner

FORWARD-LOOKING ALTITUDE DETECTOR

BACKGROUND

1. Field of the Invention

The present disclosure relates generally to dead reckoning systems and more particularly to a dead reckoning altimeter apparatus using a speedometer and a forward-looking accelerometer for measuring changes in altitude. The present disclosure also relates particularly to an inclinometer apparatus using a speedometer and a forward-looking accelerometer for measuring inclination angle.

2. Description of the Background Art

Dead reckoning (DR) is the process of estimating one's current position based upon a previously determined position and advancing that position based upon measured speed, direction and/or acceleration. The DR begins with an initial known position, or fix. The fix can be determined using ranging, triangulation or map matching. It is common to use radio signals for ranging from the global navigation satellite system (GNSS) for establishing an initial position fix from which to start dead reckoning.

Dead reckoning speed can be measured by many methods. Before modern instrumentation, DR speed was determined aboard ship by throwing a wood float, called a log, overboard and counting the knots on a line tied to the float that passed a sailor's hand in a sandglass measured time as the ship moved forward through the water. More modern ships use engine rpm, automatic logs for measuring water speed, or bottom looking Doppler sonar. Road vehicles typically measure speed by measuring revolution rates of their wheels. Road vehicles can also use engine rpm and Doppler sonar or radar for speed measurement. The horizontal direction can be measured with a magnetic or flux gate compass. Dead reckoning direction can also be determined by integrating the rate of change of angles sensed by an angular rate sensor. An angular rate sensor is sometimes referred to as a gyro. Inertial systems that integrate directional linear accelerations can be used for dead reckoning, especially for aircraft.

Even with the advancement of the convenience and accuracy of the global navigation satellite system (GNSS), there continues to be a need for dead reckoning for cases when continuous GNSS fixes cannot be obtained or are noisy. Further, global navigation satellite system positioning tends to be less accurate and noisier for altitude and vertical heading angles than for horizontal positions and horizontal heading angles.

SUMMARY

The present disclosure describes an apparatus and method for measuring changes in altitude by measuring forward motion. The present disclosure also describes an apparatus and method for determining incline angle by measuring forward motion.

One embodiment is a dead reckoning altimeter having a speedometer to determine forward speed; an accelerometer to measure forward acceleration; and a DR calculator to calculate an altitude change based on the speed and the measured acceleration. The altimeter may also include a yaw rate sensor to measure yaw angle rate, and a yaw compensator to compensate the measured acceleration according to the yaw angle rate where the DR calculator is configured to use the compensated acceleration with the speed for calculating the altitude change.

Another embodiment is a method for dead reckoning altitude, comprising determining forward speed, measuring forward acceleration, and calculating an altitude change based on the speed and the measured acceleration. The method may also include measuring yaw angle rate, compensating the measured acceleration according to the yaw angle rate, and using the compensated acceleration with the speed for calculating the altitude change.

Another embodiment is an inclinometer having a speedometer to determine forward speed; an accelerometer to measure forward acceleration; and an incline angle calculator to calculate an incline angle based on the rate of change of the speed and the measured acceleration. The inclinometer may also include a yaw rate sensor to measure yaw angle rate and a yaw compensator configured to use the yaw angle rate to compensate the measured acceleration where the incline angle calculator is configured to use the compensated acceleration with the rate of change of speed to calculate the incline angle.

Another embodiment is a method for determining incline angle, comprising determining forward speed; measuring forward acceleration, and calculating an incline angle based on the measured acceleration and a rate of change of the speed. The method may also include measuring yaw angle rate, compensating the measured acceleration according to the yaw angle rate, and using the compensated acceleration with the rate of change of speed for calculating the incline angle.

In an embodiment a change in altitude is determined based on a forward speed and a forward acceleration.

In an embodiment an incline angle is determined based on a rate of change of forward speed and a forward acceleration.

In an embodiment a measured acceleration is compensated for a yaw angle rate.

In an embodiment a measured acceleration is compensated for a yaw angle rate according to a linear position offset.

In an embodiment a linear position offset is determined based on returns to position having opposite direction loops.

In an embodiment a measured acceleration is compensated for a yaw angle rate according to a yaw alignment angle.

In an embodiment a yaw alignment angle is determined based on returns to position having opposite direction loops.

In an embodiment a measured acceleration is compensated for an accelerometer bias.

In an embodiment an installation accelerometer bias is determined based on returns to position having opposite facing directions.

In an embodiment a restart accelerometer bias is determined based on a last incline angle.

In an embodiment an updated accelerometer bias is calibrated based on differences between external altitude fixes and dead reckoned altitudes.

These and other embodiments of the present invention and these and other attributes of the present invention will no doubt become obvious to those of ordinary skill in the art after reading the following detailed descriptions and viewing the various drawings.

DETAILED DESCRIPTION

The details of preferred embodiments and best mode for carrying out the ideas of the invention will now be presented. It should be understood that it is not necessary to employ all of the details of the preferred embodiments in order to carry out the idea of the invention.

Figure 1:
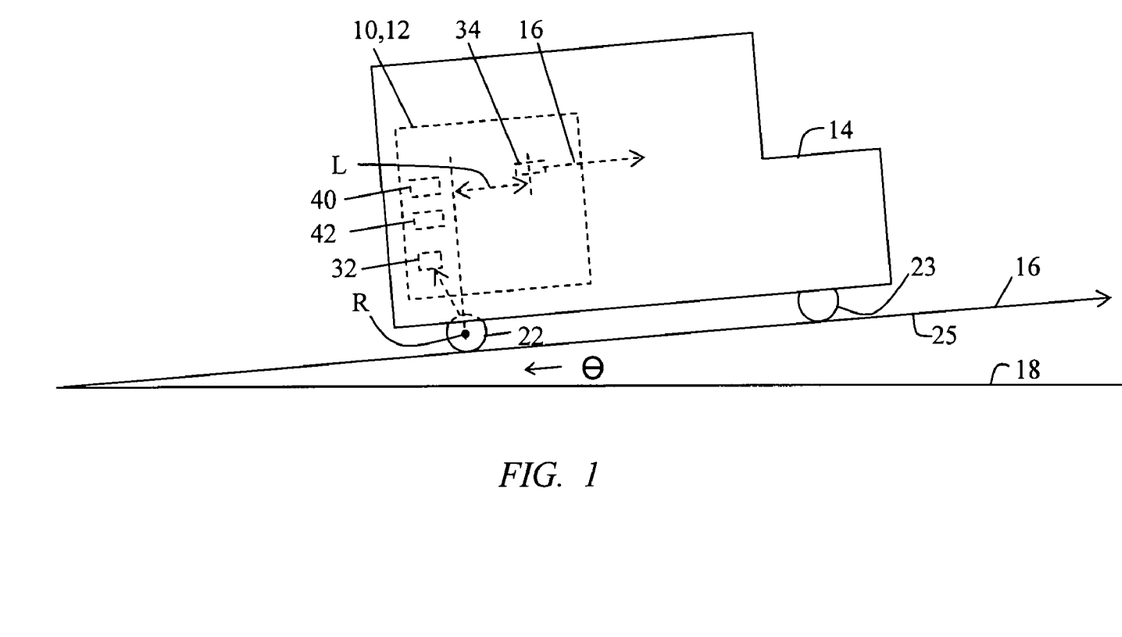
FIG. 1 illustrates a vehicle carrying a dead reckoning altimeter and an inclinometer.

FIG. 1 shows a dead reckoning (DR) altimeter apparatus and an inclinometer apparatus referred to with reference numbers 10 and 12, respectively. The apparatus 10,12 is intended to be carried in a vehicle 14 where the vehicle 14 has a forward motion direction 16 having an unknown incline angle $\theta$ from the horizontal plane 18. The vehicle 14 can be an automobile, truck, train, trolley or the like having rear wheels 22 and front wheels 23 on the ground 25.

The apparatus 10,12 includes a speedometer 32 and a forward-looking linear accelerometer 34. The vehicle 14 has a turn radius line R (FIG. 5) perpendicular to the vehicle 14 through a turn center 92 (FIG. 5) of the vehicle 14. For a vehicle 14 that turns with the front wheels 23 the turn radius line R passes approximately through the axle of the rear wheels 22. The accelerometer 34 has an installation linear position offset L with respect to the turn radius line R. The linear position offset L is illustrated in the forward direction 16.

Figure 2:
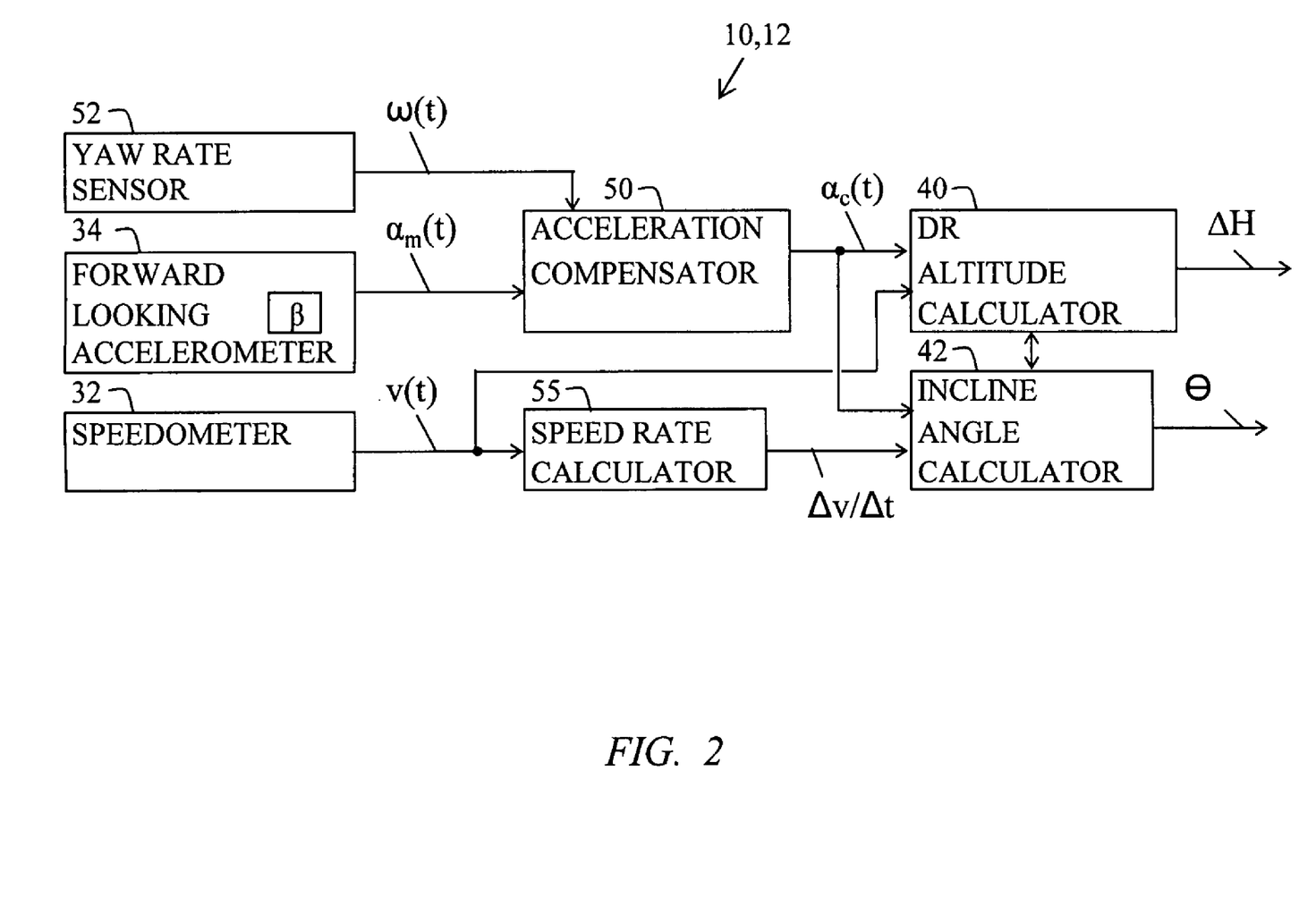
FIG. 2 is a block diagram of the dead reckoning altimeter and the inclinometer of FIG. 1.

The DR altimeter apparatus 10 includes a DR altitude calculator 40 (FIG. 2). The inclinometer apparatus 12 includes an incline angle calculator 42 (FIG. 2). The speedometer 32 may be a speed measuring device or a distance measuring device with the inclusion of a computation device for computing a forward speed v(t) based on the measured distance over a known period of time. The speedometer 32 may be a tachometer or odometer for measuring distance and then computing the speed v(t) in the forward direction 16 based on counting revolutions of rear or front wheels 22,23 over a time period. Or, the speedometer 32 may measure the forward speed v(t) for the vehicle 14 with Doppler radar or sonar or optical measurements from signals reflected off the ground 25. For example an airplane may use the apparatus 10,12 with the speedometer 32 calculating the speed v(t) based on Doppler. The accelerometer 34 may be a single axis device mounted for measuring acceleration $\alpha_m(t)$ in the forward direction 16, or may be a two of three axis device that measures the acceleration $\alpha_m(t)$ in the forward direction 16 by using a linear combination of two or three axis linear acceleration measurements.

Figure 1A:
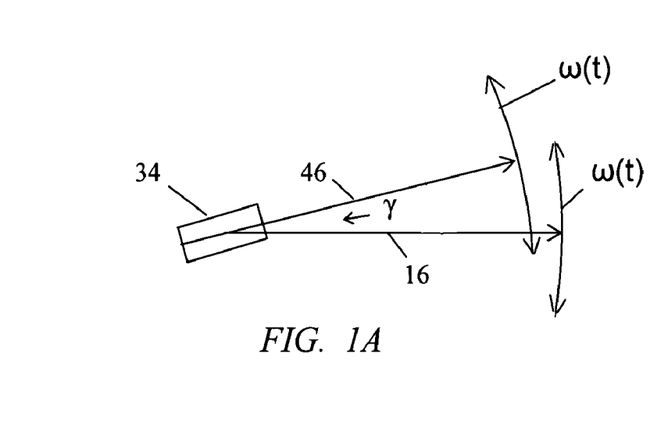
FIG. 1A illustrates a yaw alignment angle for an accelerometer of the dead reckoning altimeter and the inclinometer of FIG. 1.

FIG. 1A shows a physical mounting of the accelerometer 34 having a measurement direction 46 with a yaw alignment angle $\gamma$ with respect to the forward direction 16 of the vehicle 14. In a simple case the measurement direction 46 is the same as the forward direction 16. However, the sensor for the accelerometer 34 may be mounted so that the measurement direction 46 differs from the forward direction 16 in the horizontal plane by the yaw alignment angle $\gamma$.

FIG. 2 is a block diagram of the dead reckoning altitude apparatus 10 and the inclinometer apparatus 12 having the DR altitude calculator 40 and the incline angle calculator 42. The apparatus 10,12 includes an acceleration compensator 50 and a yaw rate sensor 52. The yaw rate sensor 52 measures a yaw angle rate $\omega(t)$. The acceleration compensator 50 compensates the measured acceleration $\alpha_m(t)$ for the effect of the yaw angle rate $\omega(t)$ and the effect of an accelerometer bias $\beta$ for determining a compensated acceleration $\alpha_c(t)$.

The DR altitude calculator 40 uses the forward speed v(t) and the compensated forward acceleration $\alpha_c(t)$ for calculating an altitude change $\Delta H$. The incline angle calculator 42 includes a speed rate calculator 55 using the speed v(t) to determine a rate of change of speed $\Delta v/\Delta t$ versus time and then uses the speed rate $\Delta v/\Delta t$ with the compensated forward acceleration $\alpha_c(t)$ for calculating the incline angle $\theta$.

Figure 3:
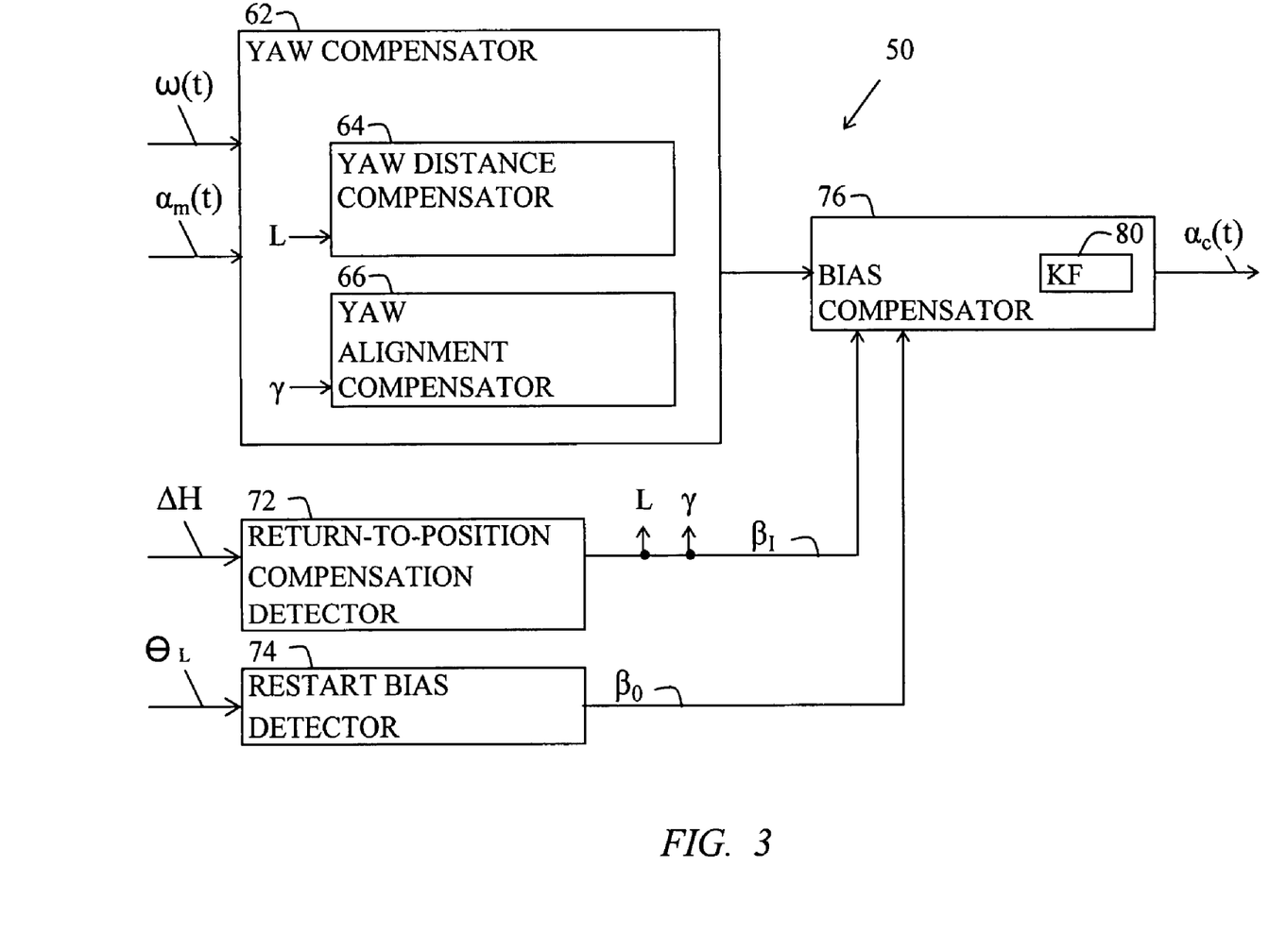
FIG. 3 is a block diagram of an acceleration compensator of the dead reckoning altimeter and the inclinometer of FIG. 1.

FIG. 3 is a functional block diagram acceleration compensator 50. The acceleration compensator 50 includes a yaw compensator 62 including a yaw distance compensator 64 and a yaw alignment compensator 66. The yaw distance compensator 64 uses the measured yaw angle rate $\omega(t)$ and the offset L to calculate a position offset acceleration measurement error that occurs when the vehicle 14 is turning (yawing), and compensates the measured acceleration $\alpha_m(t)$ for this error. The position offset error is calculated as $\omega^2(t) \times L$. The yaw alignment compensator 66 uses the measured yaw angle rate $\omega(t)$, the speed v(t) and the yaw alignment angle $\gamma$ to calculate a yaw alignment angle acceleration measurement error that occurs when the vehicle 14 is turning (yawing), and compensates the measured acceleration $\alpha_m(t)$ for this error. The yaw alignment angle error is calculated as $\omega(t) \times v(t) \times \gamma$.

The acceleration compensator 50 also includes a return-to-position compensation detector 72, a restart bias detector 74, and an accelerometer bias compensator 76.

The compensation detector 72 tracks altitude changes $\Delta H$'s between triggers, and determines an installation accelerometer bias $\beta_I$ for the sum of the altitude changes $\Delta H$'s between the triggers to be zero, or for a return altitude $H_R$ to be equal to a start altitude $H_1$. In order to eliminate the effect of parking place pitch angle, the vehicle 14 may be parked facing opposite directions for determinations of altitudes $H_R$ and $H_1$. The accelerometer bias $\beta_I$ is determined that results in the zero sum altitude changes $\Delta H$'s. The trigger can be automatic (preferably after a manual enablement) when the apparatus 10,12 senses that the horizontal position has returned, or manual when an operator knows he has returned to the same position. In order to determine the combination of the accelerometer bias $\beta_I$, the linear position offset L and the yaw alignment angle $\gamma$, the vehicle 14 is driven to loop back to the start position in a least once in a clockwise loop and at least once in a counterclockwise loop. These operations are illustrated in the flow charts of FIG. 8 and FIGS. 7B and 7C and described in the accompanying detailed descriptions.

The restart bias detector 74 uses the two ideas that the speed v(t) is still very nearly zero at the start of motion of the vehicle 14 and the incline angle θ at the start of motion is the very nearly the same as the last incline angle $θ_L$ when the vehicle 14 was last in motion before stopping. Accordingly, a restart accelerometer bias $β_0$ is estimated with an equation 1. In the equation 1 the acceleration α is preferably taken after acceleration compensation for yaw angle rate ω(t). The g is the constant acceleration due to gravity.

$$β_0 = α - g \sin θ_L \quad\quad 1)$$

The accelerometer bias β may change rapidly when the apparatus 10,12 is warming up after being in an unpowered state. There may be a long warm up period before the accelerometer bias β is stable enough to be accurately calibrated. This problem can be mitigated according to the equation 1 by determining the restart accelerometer bias $β_0$ using an assumption that the incline angle $θ_L$ immediately at start of motion has not changed from the incline angle $θ_L$ that was last calculated for the last motion before stopping and assuming that the speed v(t) immediate at the start of motion is zero.

The accelerometer bias compensator 76 uses the installation bias $β_I$ and/or the restart bias $β_0$ and/or the bias β determined by comparisons with external navigation information for compensating the measured acceleration $α_m(t)$. A Kalman filter 80 (FIG. 4) may be included as a part of the accelerometer bias compensator 76 in order to make continuously better estimates of the bias β. The bias compensator 76 may include a bias switch to switch between the installation accelerometer bias $β_I$, the restart accelerometer bias $β_0$ and the new calibrated accelerometer bias β when the Kalman filter obtains new calibrations.

A small vertical misalignment angle of the accelerometer 34 acts with gravity g to change the measurement of acceleration $α_m(t)$ by a near-constant gravity bias term of g×sin (vertical misalignment angle). This gravity bias term effectively adds (or subtracts) with the accelerometer bias β that is determined and compensated.

Figure 4:
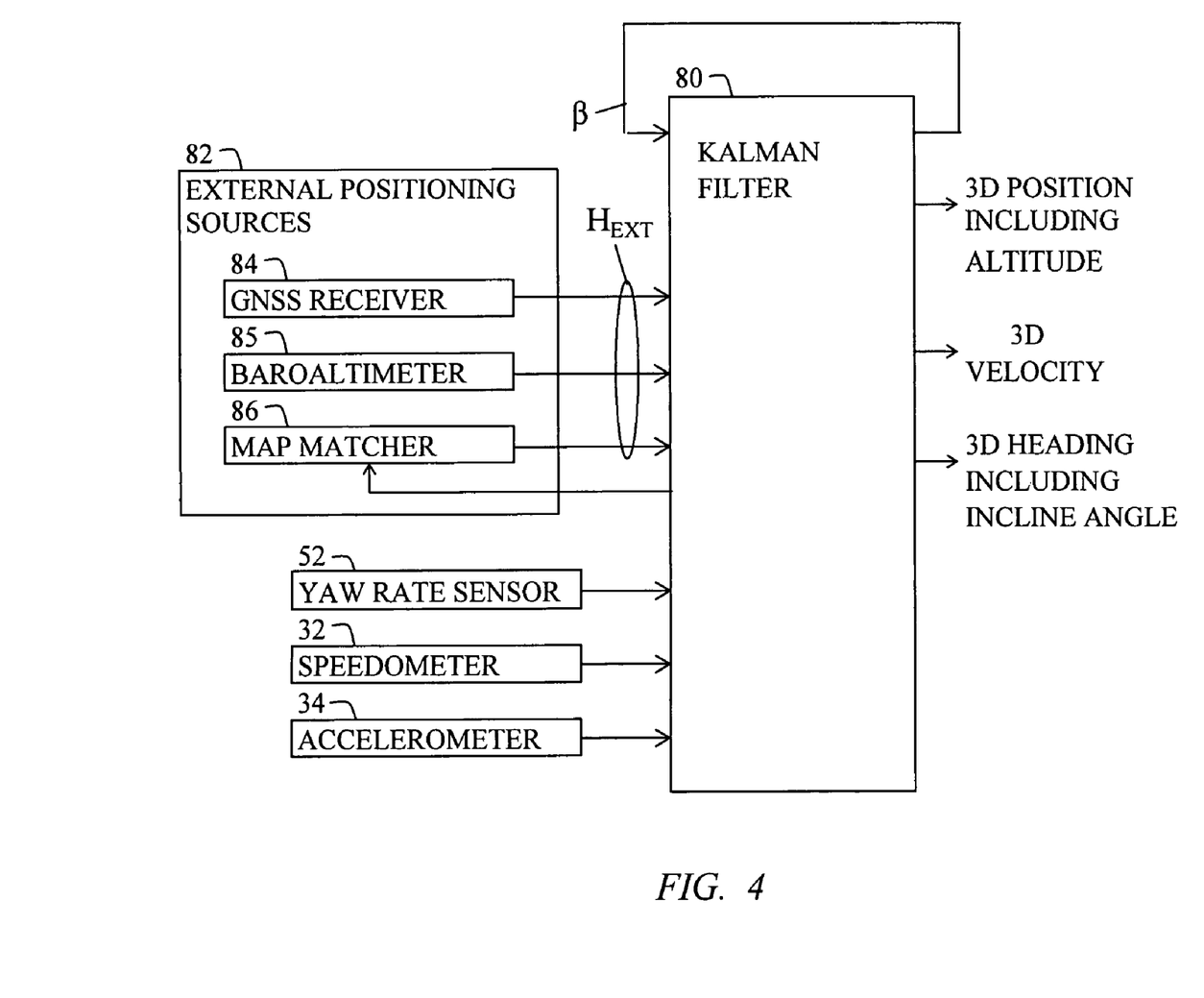
FIG. 4 is a block diagram of the dead reckoning altimeter and the inclinometer of FIG. 1 having a Kalman filter for improving the accuracies of three dimensional positions, velocities and headings.

FIG. 4 is a block diagram of the apparatus 10,12 having a Kalman filter 80 and one or more external positioning sources 82. Exemplary external sources 82 include but are not limited to a global navigation satellite system (GNSS) receiver 84, a baro-altimeter 85 and a map matcher 86. The GNSS receiver 84 receives and processes GNSS signals for providing GNSS-based positioning information such as three dimensional position including a GNSS-based external altitude fix $H_{EXT}$, time, three dimensional velocity, three dimensional heading including incline angle, satellite signal Dopplers and satellite pseudoranges. The baro-altimeter 85 provides an air pressure based external altitude fix $H_{EXT}$. The map matcher 86 uses the position and heading from the GNSS receiver 84 or the output of the Kalman filter 80 for providing a map adjusted position to match a position on a road or track to a line on an electronic map and match the left or right side of the road or track according to the direction heading information. The map matcher 86 then provides its best map matched estimate of the position along the road or track or line. The position along the road or track or line may have a map based altitude $H_{EXT}$ as on a topographic map that can be used by the Kalman filter 80.

The speedometer 32, the accelerometer 34, and the yaw rate sensor 52 provide speed v(t), measured acceleration $α_m(t)$, and yaw angle rate ω(t) to the Kalman filter 80. The Kalman filter 80 filters the differences between the noisy and/or discontinuous external altitude fixes $H_{EXT}$'s at its input and its dead reckoning altitudes H's at its output, where the dead reckoning altitude H is determined by accumulating altitude changes ΔH's. The filtered differences are used in feedback loops to provide a calibrated version of the accelerometer bias β. The Kalman filter 80 may be stored on a tangible medium as computer-readable instructions for directing a computer device, such as the apparatus 10,12 to carry out the instructions.

The filter 80 uses whatever information is available that might include, but is not limited to, accelerometer bias β, altitude changes ΔH's, speed v(t) from the speedometer 32 (or distance ΔS from the speedometer 32 from which the speed v(t) can be computed from ΔS/Δt), the measured forward acceleration $α_m(t)$ (or a partially compensated acceleration or a fully compensated acceleration $α_c(t)$), and positioning navigation information from the external sources 82 including but not limited to the external altitude $H_{EXT}$. The Kalman filter 80 uses this information for computing three dimensional position including altitude H, three dimensional velocity, and three dimensional heading including incline angle θ.

The Kalman filter 80 uses several navigation inputs of varying continuity and accuracy for providing continuously updated best estimates for 3D heading, 3D position and 3D velocity. The navigation inputs may include, but are not limited to, barometric pressure, GNSS satellite pseudoranges and Dopplers from the GNSS receiver 84 map matching for latitude, longitude and external altitude $H_{EXT}$, map matching for heading, the yaw rate sensor 52 that may be a gyro for measuring the yaw angle rate ω(t), the speed v(t) or distance S measurements from the speedometer 32, and the forward acceleration $α_m(t)$ measurements by the accelerometer 34. The GNSS receiver 84 can be a Global Positioning System (GPS) receiver.

Internal or hidden operation of the Kalman filter 80 provides accelerometer bias β calibration that is used for compensating the measured acceleration $α_m(t)$, and correcting and/or smoothing the heading, position and velocity outputs. The Kalman filter 80 operates in a similar manner to the Kalman filter described in U.S. Pat. No. 5,416,712 by Geier et al. for a "position and velocity estimation system for adaptive weighting of GPS and dead reckoning information", the teachings of which are incorporated by reference in this application. Further understanding the filtering technology of the Kalman filter 80 is provided by Elliot Kaplan and Christopher Hegarty in "Understanding GPS: principles and applications", 2nd edition, published by Artech House, Inc. of Norwood, Mass., copyright 2006, ISBN 1-58053-894-0. Chapter 9.3 on sensor integration in land vehicles, written by Geier et al., is especially instructive.

Figure 5:
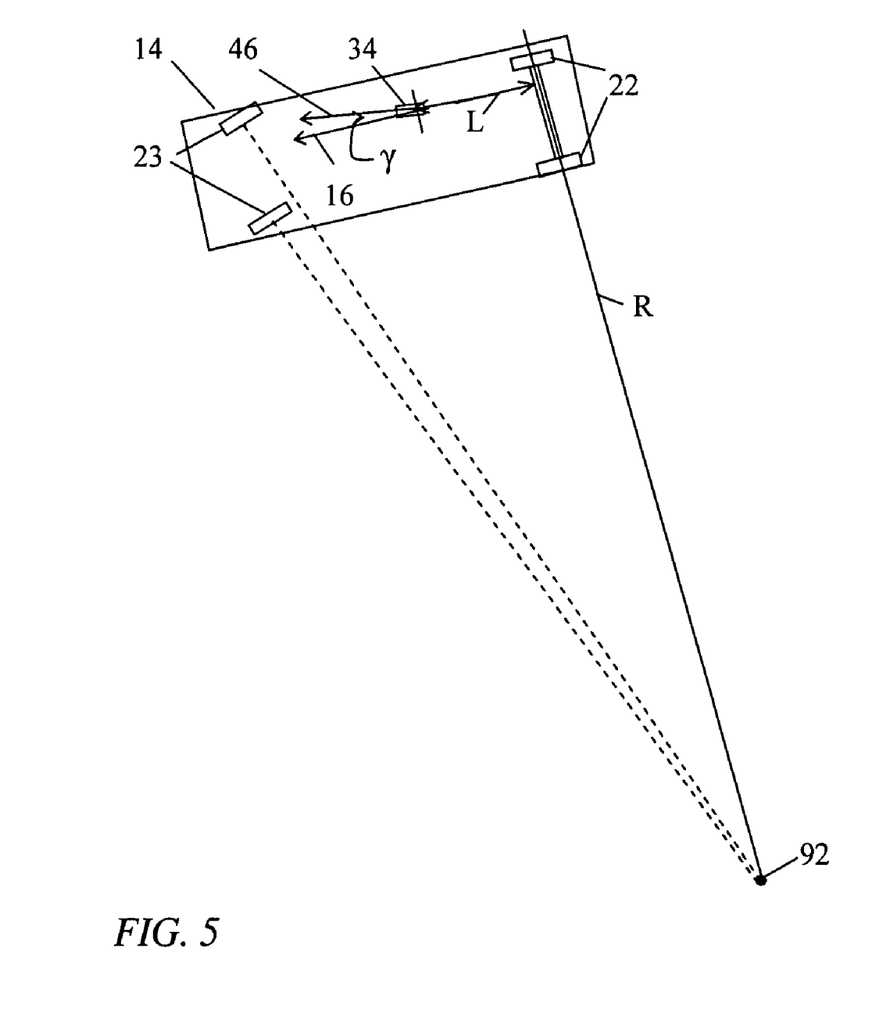
FIG. 5 illustrates an accelerometer position offset and a yaw alignment angle for the dead reckoning altimeter and the inclinometer of FIG. 1.

FIG. 5 illustrate the position offset L in the forward direction 16 between the accelerometer 34 and the turn radius line R perpendicular to the vehicle 14 that passes through the turn center 92 of the vehicle 14. For a vehicle 14 that uses the front wheels 23 for turning, the turn radius line R passes approximately through the axle for the rear wheel 22. The yaw alignment angle γ is the angle between the forward direction 46 of the accelerometer 34 and the forward direction 16 of the vehicle 14.

Figure 6:
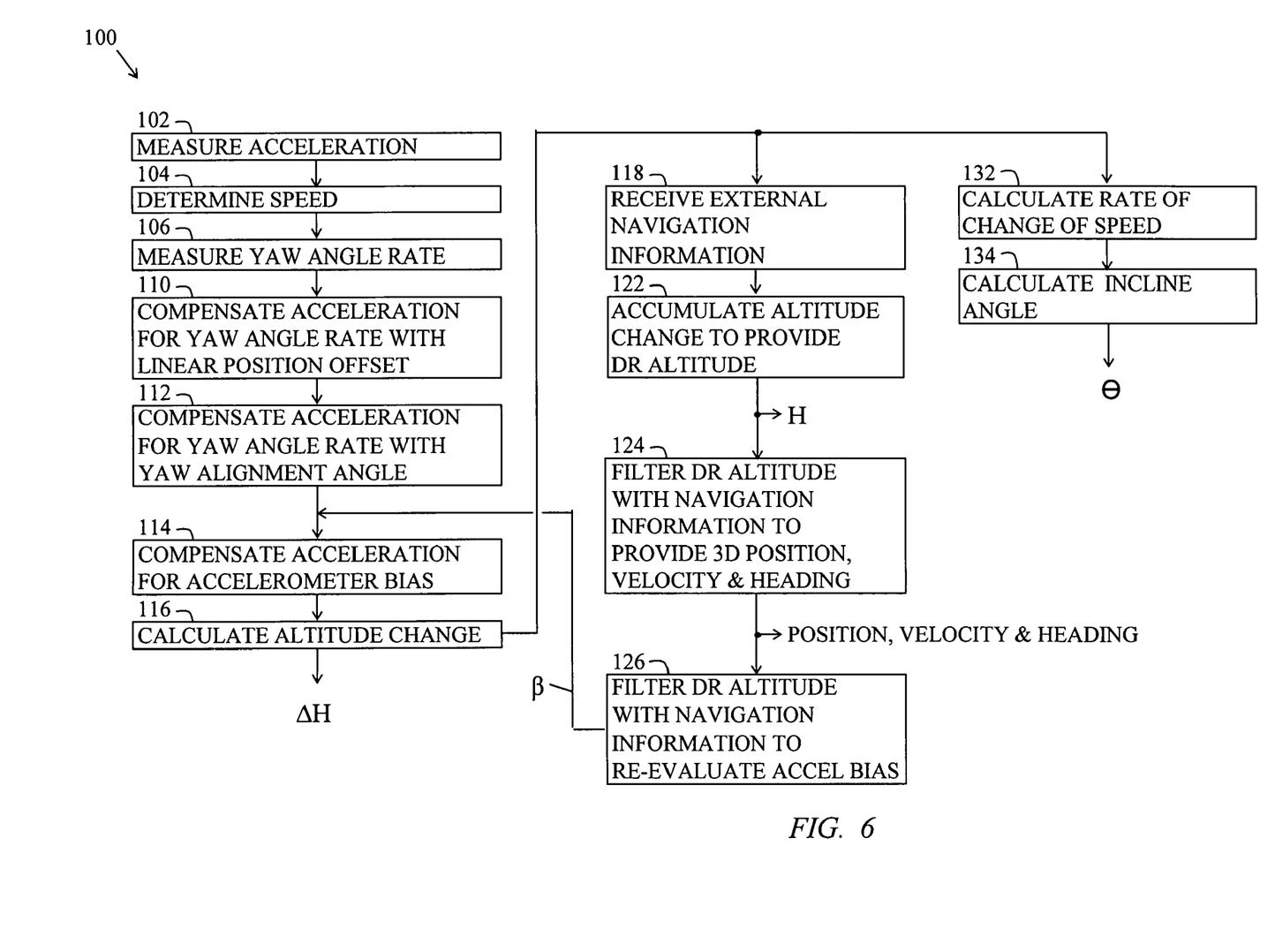
FIG. 6 is a flow chart of a method for determining altitude change and inclination angle and dead reckoning position, velocity and heading.

FIG. 6 is a flow chart of a method for determining altitude change ΔH and inclination angle θ. The steps of the method may be stored on a tangible medium 100 in a computer-readable form to be read by a computer for carrying out the steps. The apparatus 10,12 may function, operate and run as a computer for carrying out this steps. In a step 102 acceleration $α_m(t)$ is measured. In a step 104 speed v(t) is determined. In a step 106 yaw angle rate ω(t) is measured. In steps 110 and 112 the acceleration $\alpha_m(t)$ is compensated for the effects of yaw rate $\omega(t)$. In the step 110 acceleration is compensated for the linear position offset L as a function of the yaw angle rate $\omega(t)$. In the step 112 acceleration is compensated for yaw alignment angle $\gamma$ as a function of the yaw angle rate $\omega(t)$ and the speed v(t). In a step 114 acceleration is compensated for the accelerometer bias $\beta$. In an installation calibration, the accelerometer bias $\beta$ may be determined from a return to position method (FIG. 8) as the accelerometer bias $\beta_I$. At a restart, the accelerometer bias $\beta$ may be calculated (FIG. 7A) from the last incline angle $\theta_L$ as the accelerometer bias $\beta_O$.

An altitude change $\Delta H$ is calculated in a step 116 from the speed v(t) and the compensated acceleration $\alpha_c(t)$. In a step 118 external positioning information such as positions, pseudoranges, altitudes, Dopplers and headings are received from external positioning sources 82. In a step 122 the altitude changes $\Delta H$ are accumulated to provide a DR altitude H. For continuous operation the DR altimeter 10 accumulates a sequence of altitude changes $\Delta H$'s to the last previous DR altitude H for providing a continuous sequence of DR altitudes H's. In a step 124 the DR altitude H is filtered based on the external positioning information with Kalman filtering techniques for calculating three dimensional position including the altitude H, three dimensional velocity and three dimensional heading including the incline angle $\theta$. In a step 126 the accelerometer bias $\beta$ is re-calculated with Kalman filtering techniques using the DR altitude H and the external positioning information then applied for updating the accelerometer bias $\beta$ used for providing the compensated acceleration $\alpha_c(t)$. The steps 124 and 126 are normally performed together with states of the Kalman filtering technique.

The rate of change of speed $\Delta v/\Delta t$ is calculated in a step 132 from the speed v(t) and time. In a step 134 the incline angle $\theta$ is calculated from the compensated acceleration $\alpha_c(t)$ and the rate of change of speed $\Delta v/\Delta t$ using an equation 4 below.

Figure 7A:
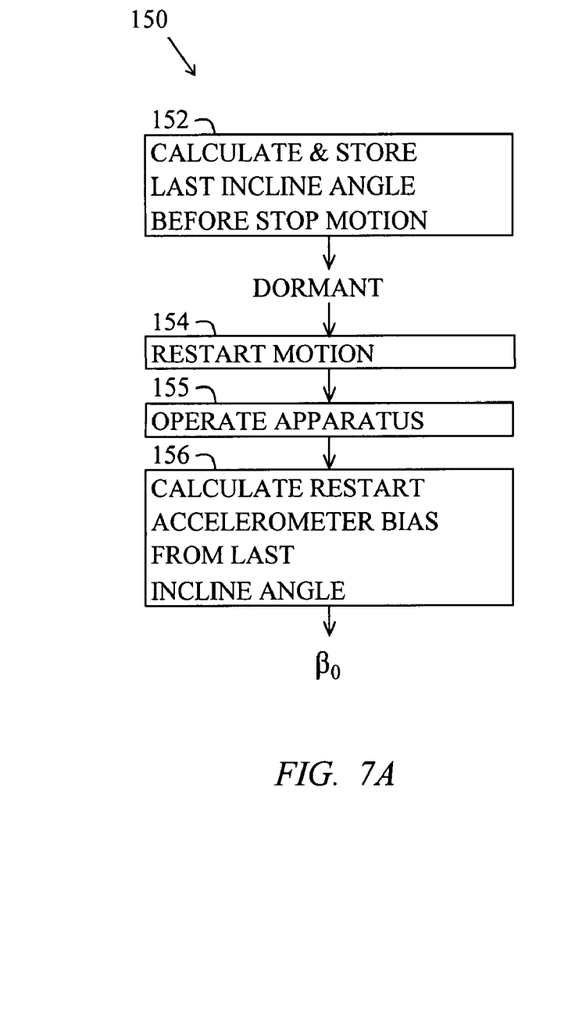
FIG. 7A is a flow chart of a method for determining an accelerometer bias calibration for a restart.

FIG. 7A is a flow chart of a method for calculating the restart accelerometer bias $\beta_O$. The steps of the method may be stored on a tangible medium 150 in a computer-readable form to be read by a computer for carrying out the steps. The apparatus 10,12 may function, operate and run as a computer for carrying out this steps. In a step 152 the incline angles $\theta$'s are calculated. When the apparatus 10,12 is powered down, the last incline angle $\theta_L$ that was calculated is stored.

The apparatus 10,12 is powered down in a dormant or turned off state for an arbitrary period of time. In a step 154 the apparatus 10,12 is turned on and starts motion. In a step 155 the apparatus 10,12 operates for measuring the acceleration $\alpha_m(t)$ and compensating the measured acceleration $\alpha_m(t)$ for yaw angle rate $\omega(t)$ in order to provide the acceleration a in the equation 1 above. In a step 156 the restart accelerometer bias $\beta_O$ is calculated in the equation 1 from the incline angle $\theta_L$.

Figure 7B:
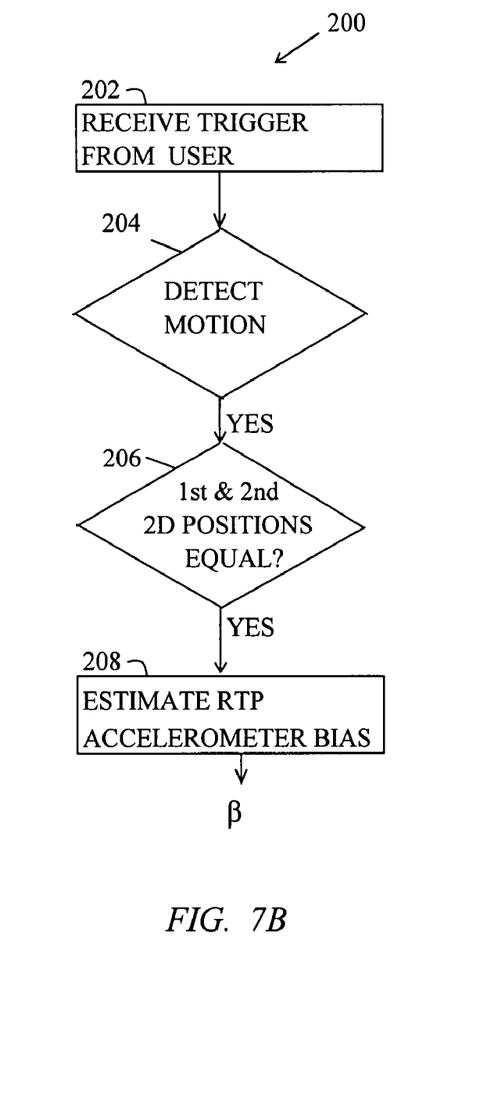
FIG. 7B is a flow chart of a return-to-position method for determining an accelerometer bias calibration.

FIG. 7B is a flow chart of an embodiment of a return-to-position calibration method. The steps of the method may be stored on a tangible medium 200 in a computer-readable form to be read by a computer for carrying out the steps. The apparatus 10,12 may function, operate and run as a computer for carrying out this steps. In a step 202 a return-to-position trigger is received from a user and the apparatus 10,12 determines its position and a first altitude $H_1$. In a step 204 the apparatus 10,12 detects that it is moving. In a step 206 a return loop altitude $H_R$ is determined when the apparatus 10,12 determines that it has returned to the same two dimensional horizontal position within a threshold of one to three meters within a predetermined range of time. The length of time may be in the range of a few seconds to a few minutes. Alternatively, a return loop altitude $H_R$ is measured when a second trigger is received.

In a simple case a driver issues a trigger to the apparatus 10,12 when the vehicle 14 parked and then drives in a loop back to the same parked location. The method makes the assumption that the return loop altitude $H_R$ is the same as the start altitude $H_1$ when it detects that the apparatus 10,12 has returned to the same horizontal position or is triggered a second time. In a step 208 the apparatus 10,12 determines the accelerometer bias $\beta$ that causes the sum of the altitude changes $\Delta H$'s to be zero or determines the accelerometer bias $\beta$ that cause the start altitude $H_1$ and return loop altitude $H_R$ to be equal.

Figure 7C:
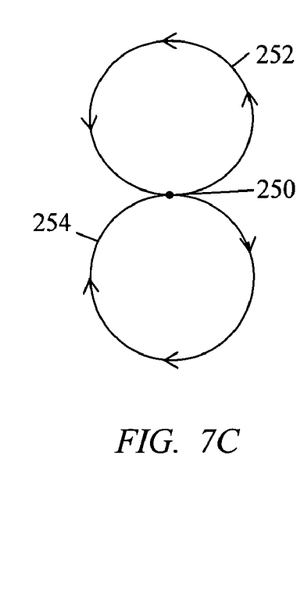
FIG. 7C is a diagram of vehicle travel where a counter rotation loop is used for determining an accelerometer bias calibration for the dead reckoning altimeter and the inclinometer of FIG. 1.

FIG. 7C is a diagram of vehicle travel for return to position calibration. The vehicle 14 starts at a position 250, travels in a counterclockwise loop 252 back to the start position 250 for a single loop calibration. For a double loop calibration the vehicle 14 continues through a clockwise loop 254 back to the start position 250. Either the counterclockwise loop 252 or the clockwise loop 254 can be first. Either or both of the loops 252 and 254 may be repeated any number of times and the results averaged and the loops are not required to be exactly circular.

Figure 8:
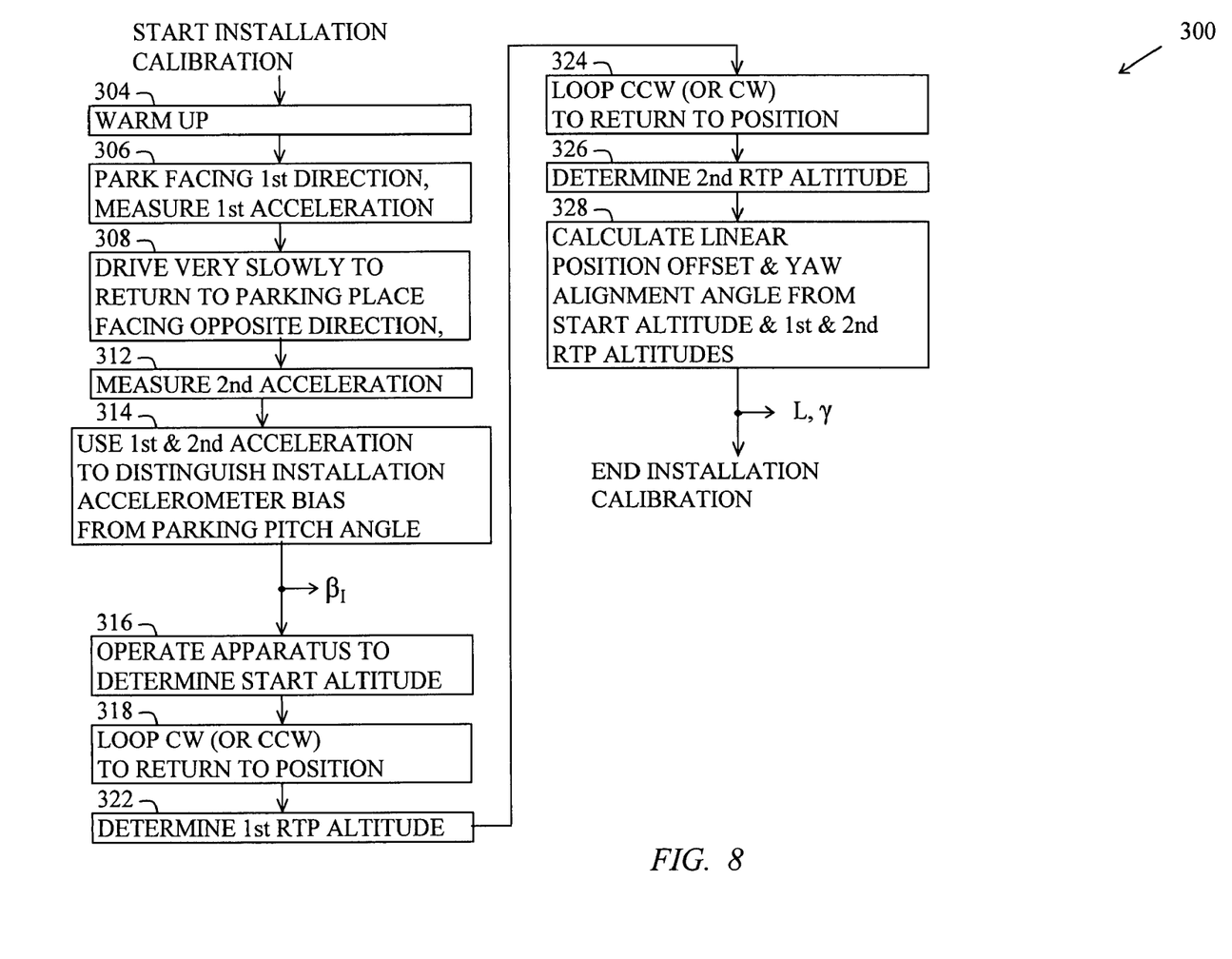
FIG. 8 is a flow chart of a return-to-position initial installation method for determining an accelerometer bias, a linear position offset and a yaw alignment angle for the dead reckoning altimeter and the inclinometer of FIG. 1 and the method of FIG. 6.

FIG. 8 is a flow chart of a double loop installation calibration using a return to position method for determining installation value $\beta_I$ for accelerometer bias $\beta$, and values for a linear position offset L, and a yaw alignment angle $\gamma$. The steps of the method may be stored on a tangible medium 300 in a computer-readable form to be read by a computer for carrying out the steps. The apparatus 10,12 may function, operate and run as a computer for carrying out this steps. In a step 304 the apparatus 10,12 is warmed up. The warm up stabilizes the accelerometer bias $\beta$. In a step 306 the vehicle 14 is parked facing a first direction. A first acceleration $\alpha_m(t)$ is measured. This measured acceleration $\alpha_m(t)$ will be small because the vehicle 14 is not moving.

The vehicle 14 is slowly driven in a step 308 to return to the same parking space and stopped facing in the opposite direction. A second acceleration $\alpha_m(t)$ is measured. This measured acceleration $\alpha_m(t)$ will be small because the vehicle 14 is not moving. In a step 314 the difference between the first and second measured accelerations $\alpha_m(t)$ is used to distinguish between the accelerometer bias $\beta_I$ and an effect from gravity g for a parking incline angle of the ground 25.

The apparatus 10,12 in a step 316 uses the just calculated accelerometer bias $\beta_I$ and pre-selected estimates of position offset L and yaw alignment angle $\gamma$ for determining a start altitude $H_1$. In a step 318 the vehicle 14 is rapidly driven in a clockwise (or counterclockwise) loop back to the parking space. The driving must be fast enough to cause a yaw angle rate $\omega(t)$ similar to the yaw angle rates $\omega(t)$'s that will be encountered in operation. In a step 322 a first return to position (RTP) altitude $H_{R1}$ is determined. In a step 324 the vehicle 14 is expeditiously driven in the opposite direction loop back to the parking space. The driving must be fast enough to cause a yaw angle rate $\omega(t)$ similar to the yaw angle rates $\omega(t)$'s that will be encountered in operation. In a step 326 a second return to position (RTP) altitude $H_{R2}$ is determined. In the step 328 the effective installation position offset L and yaw alignment angle $\gamma$ are calculated from the start altitude $H_1$, first RTP altitude $H_{R1}$ and second RTP altitude $H_{R2}$ using equations 2 and 3 below. The step 328 determines the accelerometer bias $\beta_I$, the position offset L and the yaw alignment angle $\gamma$ for the sum of the altitude changes $\Delta H$'s to be zero between the start altitude $H_1$ and the first loop altitude $H_{R1}$ and between the first loop altitude $H_{R1}$ and the second loop altitude $H_{R2}$; or determines the accelerometer bias $\beta_f$, the position offset L and the yaw alignment angle $\gamma$ that equalizes the start altitude $H_1$, the first loop altitude $H_{R1}$ and the second loop altitude $H_{R2}$.

Determination of Altitude and Incline Angle

The following section shows the operation of the apparatus 10,12 for a calculation of altitude change $\Delta H$ and incline angle $\theta$. The equation 2 shows a calculation of altitude change $\Delta H$ based on compensated acceleration $\alpha_c(t)$ and speed $v(t)$ for a measurement time $\Delta T$ and the gravity acceleration constant g.

$$2)\ \Delta H = \left\{ \int_0^{\Delta T} \alpha_c(t)v(t)\,dt - (1/2)[v^2(\Delta T) - v^2(0)] \right\}(1/g)$$

The equation 3 shows the compensated acceleration $\alpha_c(t)$ as a function of measured acceleration $\alpha_m(t)$, accelerometer bias $\beta$, positional yaw rate error $\omega^2(t) \times L$, and an alignment yaw rate error $\omega(t) \times v(t) \times \gamma$.

$$\alpha_c(t) = \alpha_m(t) + \beta - \omega^2(t)L - \omega(t)v(t)\gamma \quad 3)$$

The positional yaw rate error is the same for either left or right turns. The alignment yaw rate error is equal and opposite for left and right turns. The equation 4 shows the incline angle $\theta$ as a function compensated acceleration $\alpha_c(t)$ and rate of change of speed versus time $\Delta v/\Delta t$.

$$\theta = \sin^{-1}\{[(\alpha_c(t) - \Delta v/\Delta t]/g\} \quad 4)$$

General Benefits

An embodiment may improve the performance of a vehicle navigation apparatus that comprises a GPS receiver, yaw rate gyro or heading gyro, transmission shaft or wheel speed measurement device, and optionally a map-match capability. An embodiment may add a forward direction linear accelerometer and several accelerometer compensation algorithms to improve the precision of this apparatus to preferably within a meter or two, without a requirement for differential GPS measurements; and to provide continuous and smooth altitudes and incline angles without a requirement for continuous or smooth GPS measurements.

It is well-known that GPS latitude and longitude measurements are correlated to errors in altitude. By improving knowledge of altitude, the latitude and longitude knowledge may be improved through these correlations. In obstructed view situations, the GPS velocity may be noisy, or the geometry (DOP) of the GPS satellite signals may be poor, or only three GPS satellite signals may be available. In such cases the improved altitude measurement makes a significant improvement in latitude and longitude measurements.

Direct knowledge of the altitude that may be better than GPS accuracy is used in combination with a map-matching data base that includes altitude information. Using precise altitude or altitude change information, a map-match algorithm can quickly determine whether the vehicle is on one of two parallel tracks at a highway off-ramp, one of which is rising or falling and one of which is not. Using GPS and heading gyro alone may not produce the required accuracy to make such a determination until a substantial distance has been traveled, to the point that the two possible paths are separated horizontally in the map-match data base by a distance commensurate with the GPS accuracy. Knowledge of whether the vehicle has left the highway is critical in determining routing information promptly. Direct knowledge of altitude can also establish the vertical location of the vehicle when in a multi-floor parking structure with no GPS coverage or imprecise GPS-based altitudes.

Figure 9A:
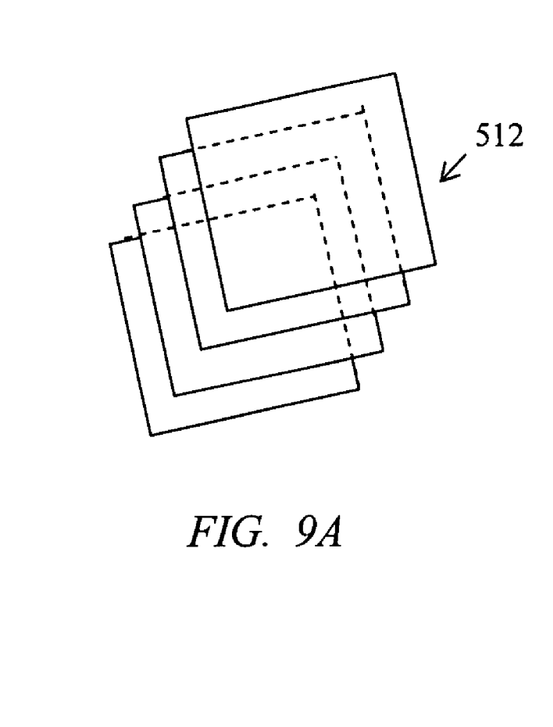
FIGS. 9A and 9B illustrate floors of a parking garage and highway connecting ramp roads where the dead reckoning altimeter and/or the inclinometer of FIG. 1 is beneficially used.

FIG. 9A illustrates floors 512 of a parking garage where the DR altitude H is used to distinguish between the floors 512 connected by a spiraling ramp when the floors 512 are not reliably distinguished by a GNSS-based altitude.

Figure 9B:
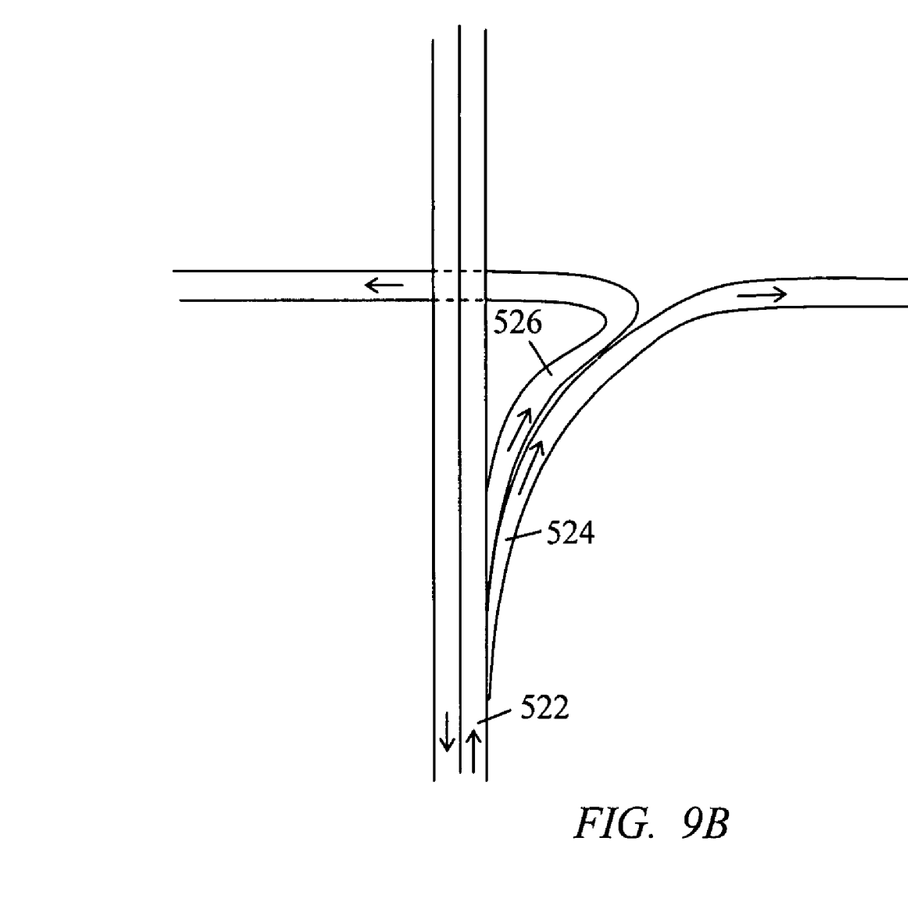

FIG. 9B illustrates a highway 522, an upward connecting road ramp 524 and a downward connecting road ramp 526 wherein the measurement of incline angle $\theta$ distinguishes between the upward ramp road 524 and the downward ramp road 526 when the ramp roads are not reliably distinguished by the GNSS-based heading.

Although the present invention has been described in terms of presently preferred embodiments, it is to be understood that such disclosure is not to be interpreted as limiting. Various supersets, subsets and equivalents will no doubt become apparent to those skilled in the art after having read the above disclosure. However, these supersets, subsets and equivalents should not be regarded as limiting the idea of the invention. Accordingly, it is intended that the claims, written below be interpreted as covering the present invention's true spirit and scope.

The invention claimed is:

1. A dead reckoning altimeter, comprising:
a speedometer to determine a forward speed;
an accelerometer to measure a forward acceleration;
a yaw rate sensor to measure a yaw angle rate;
a yaw compensator to determine a yaw compensation of said measured acceleration according to said yaw angle rate; and
a DR altitude calculator to use said yaw compensation, said measured acceleration and said speed to calculate an altitude change.

2. The altimeter of claim 1, wherein:
the yaw compensator includes a yaw position compensator to compensate said measured acceleration for said yaw angle rate with a linear position offset respective to a turn radius line to determine said compensated acceleration.

3. The altimeter of claim 2, further comprising:
a return-to-position compensation detector to estimate said linear position offset using a double return loop having a first return to position after one of a clockwise loop or counterclockwise loop and a second return to position after the other of said clockwise loop or counterclockwise loop.

4. The altimeter of claim 1, wherein:
the yaw compensator includes a yaw alignment compensator configured to compensate said measured acceleration for said yaw angle rate with a yaw alignment angle to determine said compensated acceleration.

5. The altimeter of claim 4, further comprising:
a return-to-position compensation detector to estimate said yaw alignment angle using a double return loop having a first return to position after one of a clockwise loop or counterclockwise loop and a second return to position after the other of said clockwise loop or counterclockwise loop.

6. A dead reckoning altimeter, comprising:
a speedometer to determine a forward speed;
an accelerometer to measure a forward acceleration;
a bias compensator to determine a bias compensation of said measured acceleration according to an accelerometer bias; and a DR altitude calculator to use said bias compensation, said measured acceleration and said speed to calculate an altitude change.

7. The altimeter of claim 6, further comprising:
a Kalman filter configured to filter said altitude change with an external altitude fix to estimate said accelerometer bias.

8. The altimeter of claim 7, wherein:
said external altitude fix is derived from GNSS signals.

9. The altimeter of claim 7, wherein:
said external altitude fix is derived from map matching.

10. The altimeter of claim 6, further comprising:
a return-to-position compensation detector to estimate said accelerometer bias based on a return to position.

11. The altimeter of claim 6, further comprising:
a return-to-position compensation detector to estimate said accelerometer bias based on a return to position facing in an opposite direction.

12. The altimeter of claim 6, further comprising:
an incline angle calculator to calculate an incline angle based on said bias compensation, said measured acceleration and a rate of change of said speed; and
a restart bias detector to estimate said accelerometer bias at a restart of motion after a dormant time period based on a last said incline angle before said dormant time period.

13. A dead reckoning altimeter, comprising:
a speedometer to determine a forward speed;
an accelerometer to measure a forward acceleration;
a GNSS receiver to determine a GNSS-based position including a GNSS-based altitude;
a yaw rate sensor to measure a yaw angle rate; and
a DR altitude calculator to use said speed, said measured acceleration, said yaw angle rate, and said GNSS-based position for providing a DR altitude having a better accuracy than said GNSS-based altitude.

14. The altimeter of claim 13, further comprising:
a map having floors of a parking garage; wherein:
said DR altitude is used to distinguish between said floors when said floors are not reliably distinguished by said GNSS-based altitude.

15. A method for dead reckoning altitude, comprising:
determining a forward speed;
measuring a forward acceleration with an accelerometer;
measuring a yaw angle rate with a yaw rate sensor;
in a computing device, compensating said measured acceleration according to a yaw compensation determined from said yaw angle rate; and
in a computing device, calculating an altitude change using said yaw compensation, said measured acceleration and said speed.

16. The method of claim 15, wherein:
compensating said measured acceleration includes using said yaw angle rate with a linear position offset respective to a turn radius line for determining said yaw compensation.

17. The method of claim 16, further comprising:
estimating said linear position offset using a double loop having a first return to position after one of a clockwise loop or counterclockwise loop and a second return to position after the other of said clockwise loop or counterclockwise loop.

18. The method of claim 15, wherein:
compensating said measured acceleration includes using said yaw angle rate with a yaw alignment angle for determining said yaw compensation.

19. The method of claim 18, further comprising:
estimating said yaw alignment angle using a double loop having a first return to position after one of a clockwise loop or counterclockwise loop and a second return to position after the other of said clockwise loop or counterclockwise loop.

20. A method for dead reckoning altitude, comprising:
determining a forward speed;
measuring a forward acceleration with an accelerometer;
in a computing device, compensating said measured acceleration according to an accelerometer bias to provide a bias compensation; and
in a computing device, calculating an altitude change using said bias compensation, said measured acceleration and said speed.

21. The method of claim 20, further comprising:
Kalman filtering said altitude change with an external altitude fix to estimate said accelerometer bias.

22. The method of claim 21, further comprising:
deriving said external altitude fix from GNSS signals.

23. The method of claim 21, wherein:
deriving said external altitude fix from map matching.

24. The method of claim 20, further comprising:
estimating said accelerometer bias based on a return to position.

25. The method of claim 20, further comprising:
estimating said accelerometer bias based on a return to position facing in an opposite direction.

26. The method of claim 20, further comprising:
calculating incline angle based on said bias compensation, said measured acceleration and a rate of change of said speed; and
estimating said accelerometer bias at a restart of motion after a dormant time period based on a last said incline angle before said dormant time period and said measured acceleration.

27. A method for dead reckoning altitude, comprising:
determining a forward speed;
measuring a forward acceleration with an accelerometer;
determining a GNSS-based position including a GNSS-based altitude with a GNSS receiver;
measuring a yaw angle rate with a yaw rate sensor; and
in a computing device, calculating an altitude change using said speed, said measured acceleration, said yaw angle rate, and said GNSS-based position for providing a DR altitude having a better accuracy than said GNSS-based altitude.

28. The method of claim 27, further comprising:
providing an electronic map having floors of a parking garage; and
using said DR altitude for distinguishing between said floors when said floors are not reliably distinguished by said GNSS-based altitude.

* * * * *